United States Patent
Abouzour

(10) Patent No.: US 9,152,464 B2
(45) Date of Patent: Oct. 6, 2015

(54) ADJUSTING A SERVER MULTIPROGRAMMING LEVEL BASED ON COLLECTED THROUGHPUT VALUES

(75) Inventor: Mohammed Abouzour, Waterloo (CA)

(73) Assignee: IANYWHERE SOLUTIONS, INC., Dublin, CA (US)

(*) Notice: Subject to any disclaimer, the term of this patent is extended or adjusted under 35 U.S.C. 154(b) by 327 days.

(21) Appl. No.: 12/875,292

(22) Filed: Sep. 3, 2010

(65) Prior Publication Data

US 2012/0060172 A1    Mar. 8, 2012

(51) Int. Cl.
G06F 9/46    (2006.01)
G06F 9/50    (2006.01)

(52) U.S. Cl.
CPC ........ G06F 9/5027 (2013.01); *G06F 2209/508* (2013.01); *G06F 2209/5011* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 7,500,216 B1* | 3/2009 | Blunno et al. | 716/104 |
| 7,681,196 B2* | 3/2010 | Vedula | 718/104 |
| 2003/0088609 A1* | 5/2003 | Guedalia et al. | 709/107 |
| 2005/0262507 A1* | 11/2005 | Langen et al. | 718/100 |
| 2009/0178042 A1* | 7/2009 | Mehta et al. | 718/101 |
| 2009/0178045 A1* | 7/2009 | Gupta et al. | 718/103 |
| 2010/0005468 A1* | 1/2010 | Chang et al. | 718/102 |
| 2010/0083264 A1* | 4/2010 | Mehta et al. | 718/103 |
| 2010/0083272 A1* | 4/2010 | Hellerstein et al. | 718/104 |
| 2010/0153928 A1* | 6/2010 | Livshits et al. | 717/132 |

* cited by examiner

*Primary Examiner* — Tammy Lee
(74) *Attorney, Agent, or Firm* — Sterne Kessler Goldstein & Fox, P.L.L.C.

(57) ABSTRACT

Methods, apparatus and computer program products for allocating a number of workers to a worker pool in a multiprogrammable computer are provided, to thereby tune server multiprogramming level. The method includes the steps of monitoring throughput in relation to a workload concurrency level and dynamically tuning a multiprogramming level based upon the monitoring. The dynamic tuning includes adjusting with a first adjustment for a first interval and with a second adjustment for a second interval, wherein the second adjustment utilizes data stored from the first adjustment.

20 Claims, 10 Drawing Sheets

ADJUSTING A SERVER MULTIPROGRAMMING LEVEL BASED ON COLLECTED THROUGHPUT VALUES

FIELD OF THE INVENTION

The present invention generally relates to server multiprogramming levels.

BACKGROUND OF THE INVENTION

Servers are used in a variety of software environments. Each server-based application has its own workload characteristics. As a result, a server must be configured to achieve the best performance possible for a specific workload on specific hardware. One of the many configuration parameters that servers have is their multiprogramming level (MPL). The MPL is the concurrency level of the server. The concurrency level of the server is measured by how many server requests are handled concurrently.

Setting the MPL too high or too low can have an adverse effect on performance. A high MPL setting might cause increased contention on shared resources (e.g., "thrashing") while a low MPL might limit the beneficial concurrency level of the server, thus needlessly reducing the amount of work a server can perform.

Current approaches to tuning server MPL do not adequately handle different types of situations. For example, server throughput may consistently increase as the MPL setting is increased, then appear to peak at a particular level. Traditional. MPL tuning algorithms would stay at that level, and assume that a peak allocation had been achieved. Real-life applications however, may have multiple peaks, and the point selected by a traditional tuning algorithm may not be the best level. In addition, because they typically take small, incremental steps, traditional algorithms may not reach an optimal level quickly.

Thus, what is needed are improved systems and methods for selecting a MPL level that addresses the challenges noted above.

BRIEF SUMMARY

Embodiments of the present invention relate to multiprogrammable computers. Specifically, an embodiment provides a method, system and article of manufacturer of allocating a number of workers to a worker pool in a multiprogrammable computer. The method includes the steps of monitoring throughput in relation to a workload concurrency level and dynamically tuning a multiprogramming level based upon the monitoring. The dynamic tuning includes adjusting with a first adjustment for a first interval and with a second adjustment for a second interval, wherein the second adjustment utilizes data stored from the first adjustment.

Another embodiment includes a system for controlling the allocation of workers in a multiprogrammable computer. The system includes a storage, a worker pool, and a controller. The controller is configured to determine an amount of workers to allocate to the worker pool using the following steps: receiving a first throughput value; increasing the number of workers in the worker pool by a first amount; receiving a second throughput value; storing a total number of workers and the second throughput value as a data set in the storage; comparing the first throughput value to the second throughput value; if the second throughput value is greater than the first throughput value, then increasing the number of workers in the worker pool by a second amount; if the second throughput value is less than the first throughput value, then decreasing the number of workers in the worker pool by a third amount; repeating these steps for a fixed number of times. Each time the current number of workers in the worker pool and the second throughput value are stored in a new data set; analyzing the stored data sets in the storage; selecting an amount of workers for the worker pool based on the analyzing; repeating the steps starting with the first step.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the invention.

Figure 1:
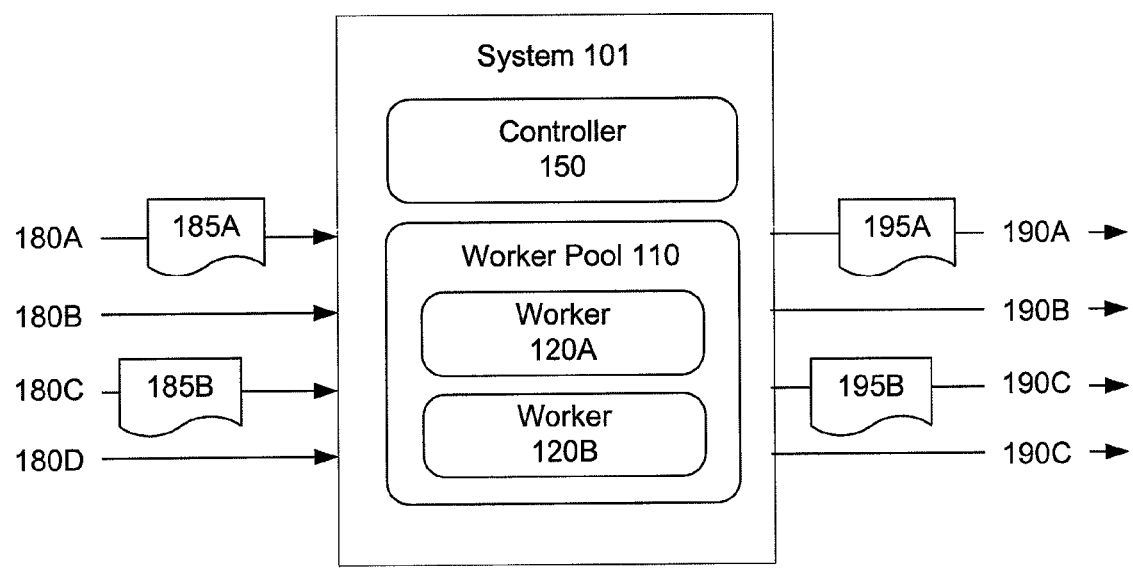
FIG. 1 depicts a system allocating a number of workers to a worker pool in a multiprogrammable computer, according to an embodiment of the present invention.

FIG. 1 shows a diagram illustrating an embodiment of system 100 for optimizing the number of workers in a multiprogramming environment. In doing so, tuning the server multiprogramming level is achieved.

In an embodiment, system 100 includes server 101 having input connections 180A-D and output connections 190A-D, each input connection 180 capable of relaying requests, for example 185A-B, and each output connection 190 capable of relaying responses, for example 195A-B. In an embodiment, server 101 includes controller 150 and worker pool 110, worker pool 110 being configured to have one or more workers 120A-B.

As used herein, the term "worker" is used to generally refer to a multiprogramming technique whereby a processing device or devices operate concurrently on system tasks. One having ordinary skill in the art with access to the teachings herein, will understand that worker can describe processes, threads, fibers, protothreads, and other variations associated with concurrency.

In general, system 100 operates as follows. In an example, input connection 180A receives inbound request 185A from requesting device (not shown), and server 101 routes inbound request 185A to worker pool 110 for processing. In this example, once request 185A is processed by worker 120A, connection 190A relays responses 195A to a receiving device (not shown), response 195A being the results of the work performed by worker 120A on request 185A.

In an embodiment, worker pool 110 has a certain number of workers 120A-B available to process requests, and controller 150 determines how many workers 120 are available to process a given request 185. In an embodiment, there is a finite amount of workers that can be assigned to worker pool 110, e.g., up to one worker (or multiple workers) for each connection 180. In another embodiment, different total amounts of workers are available. Controller 150, in an embodiment, uses an approach to optimizing the number of workers 120, different optimizing approaches described below.

An embodiment of the above is described in Abouzour, et. al, "Automatic Tuning of the Multiprogramming Level in Sybase SQL Anywhere," the 5th International Workshop on Self Managing Database Systems (SMDB 2010), Mar. 1, 2010, which is incorporated by reference herein in its entirety.

Figure 2:
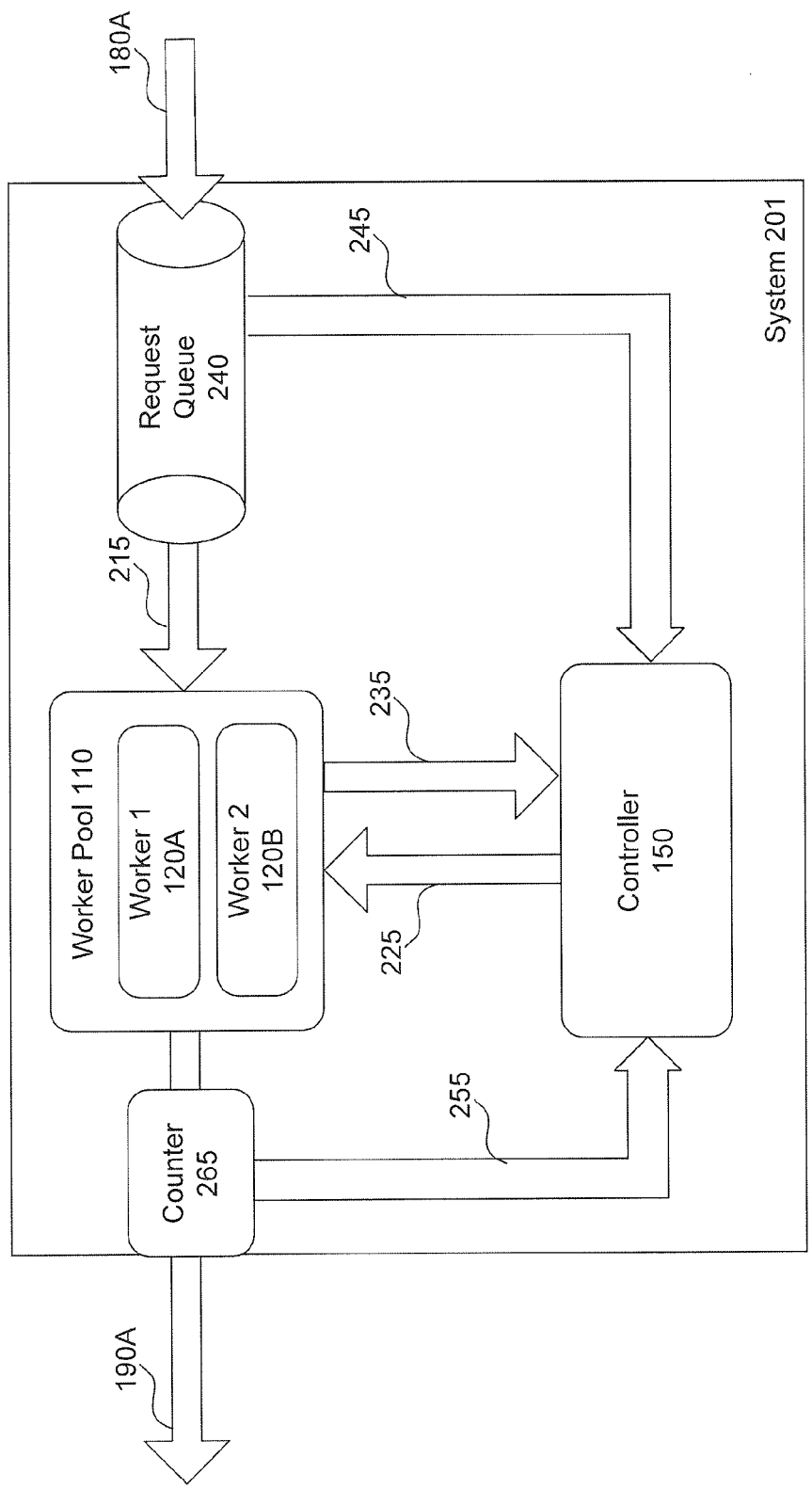
FIG. 2 depicts a system allocating a number of workers to a worker pool in a multiprogrammable computer in more detail, according to an embodiment of the present invention.

FIG. 2 depicts system 200 that, in an embodiment, shows more detail and is similar to system 101. An embodiment of system 201 includes worker pool 110, controller 150 and further includes request queue 240. Coupling is depicted on FIG. 2, which shows, in an embodiment, request queue 240 coupled to worker pool 110 via connection 215, and controller 150 via connection 245. Controller 150 is shown, in an embodiment, coupled to worker pool 110 via connections 225 and 235, and worker pool 110 is shown coupled to request queue via connection 215, and also coupled to controller 150. Generally speaking, in an embodiment, when requests 180 are received in system 201, the received requests are routed to request queue 240 where they are stored until workers are available to process the requests. In an embodiment, worker pool 110, request queue 240 and counter 265, relay information to controller 150. In an embodiment, controller 150 uses the information from coupled components to select the size of the worker pool 110, different approaches using different collected pieces of information.

In an embodiment, counter 265 is incremented and decremented based on different characteristics of the system. One example characteristic that can be tracked by counter 265 is the current throughput of system 201, such throughput being advantageously relayed by counter 265 to controller 150 in real time, according to an embodiment. The components depicted coupled to controller 150 on FIG. 2 are intended to be illustrative and non-limiting. One having skill in the relevant arts, given the teachings herein, will appreciate that different data can be relayed by various components in different embodiments to controller 150. As is further described below, embodiments of controller 150 can analyze many different types of data in performance of different functions.

In an embodiment, controller 150 can be described as a multiple-input single-output (MISO) controller, meaning that multiple sources (e.g., 235, 245, 255) of information are combined by the controller into a single output (225) value. In another embodiment, multiple output values may be generated by the controller. In an embodiment, controller 150 uses an algorithm to monitor characteristics of system 200 and select a number of workers for worker pool 110. In an embodiment, a specific number of workers is selected, e.g., 100, while in another embodiment, a number of workers is relatively modified, e.g., add three workers or subtract two workers from the current number.

Controller Approaches

Figure 3:
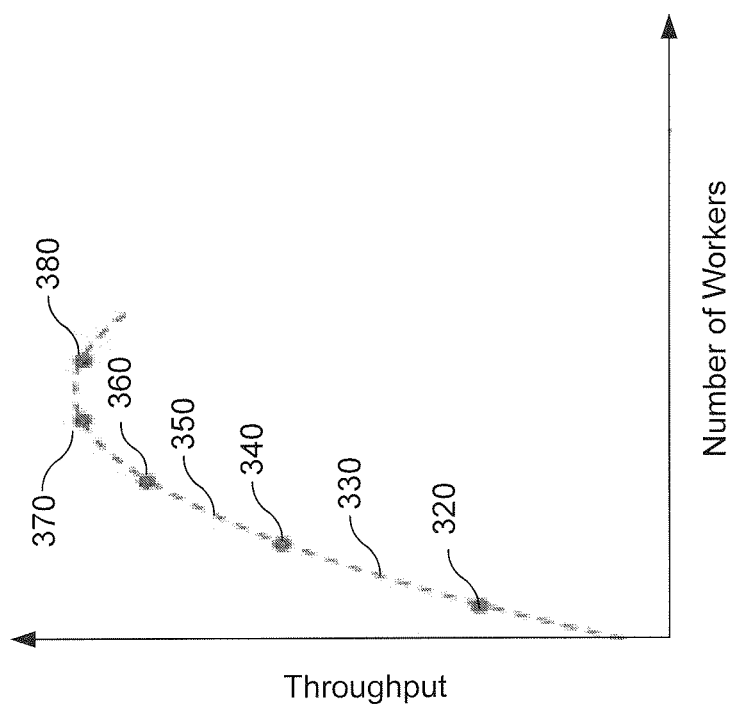
FIGS. 3-6 depict charts showing example relationships between the throughput of a server and the number of workers in a worker pool, according to an embodiment of the present invention.

FIG. 3 depicts an example analysis of the relation of throughput of system 201 to the number of workers in worker pool 110. In an embodiment, the throughput is the number of requests answered within a period of time, such metric being determined by counter 265 and request queue 240. From point 320 to 330 for example, the number of workers in worker pool 110, increases, as does the throughput of system 201. Likewise, from point 330 to 340 for example, throughput increases with an increase in workers. From 340 to 370 for example, the throughput begins to level off, and from 370 to 380 the throughput peaks and begins to decline, even with more workers. In an embodiment the assessment of the throughput changes and applied increases in workers in worker pool 110 are performed by controller 150. FIG. 3 only represents one example of the relationship between throughput and workers.

In an embodiment, controller 150 changes the number of workers in worker pool 110 using the following approach. Steps S1-S14 are listed below, along with logic specifying one approach to the flow of the steps. This list of steps is intended to be non-limiting. Steps described may be performed in a different order, use different techniques and have different results without departing from the spirit of embodiments described herein.

S1) Determine first throughput value for system 201.

S2) Wait a first predetermined interval.

S3) Change the number of workers in worker pool 110 by a fixed amount, e.g., increasing or decreasing the number of workers. In another embodiment, the number of workers is always increased at this step. In another embodiment, this step can be a "hill climbing" type of adjustment, this approach being appreciated by one having skill in the relevant art(s).

S4) Wait a second predetermined interval.

S5) Determine second throughput value for system 201.

S6) Store the current number of workers in worker pool 110 and the second throughput value in a data set. In an embodiment, additional data points associated with steps S1-S9 can be also be stored. In a non-limiting example, an additional data point collected is the amount of worker increase or decrease applied in step S3.

S7) Compare the first throughput value to the second throughput value.

S8A) If the second throughput value is greater than the first, then increase the number of workers in the worker pool by a fixed amount.

S8B) If the second throughput value is less than the first, then decrease the number of workers in the worker pool by a fixed amount.

S9) Wait a third predetermined interval.

S10) Repeat steps S1 through S9 for a number of times, for each time storing data sets of the types of data noted in step S6 above.

S11) Analyze the stored data sets.

S12) Select an amount of workers based on this analysis.

S13) Wait a fourth predetermined interval.

S14) Go to step S1 and repeat entire process for a predetermined interval.

The above example of steps S1-S14 describes elements used by embodiments described herein. Embodiments using different variations to the above-described steps algorithm are described below.

Variations and Implementation Details

Variations V1-V5 are modifications (and example implementation details) to the above described steps S1-S14. The following list is intended to be for illustration and not limitation, and can be implemented in additional embodiments:

V1) In an embodiment, the throughput values determined in steps S1 and S5, are based on information received from request queue 240 and counter 265.

V2) In an embodiment, the analysis of step S11 applies a parabolic approximation technique to the values in the stored data sets, and step S12 selects a new amount of workers based on this analysis. In an embodiment, this technique models a throughput curve as a parabolic function, and uses this determined curve to select a number of workers. As would be appreciated by one having skill in the art and with knowledge of embodiments described herein, different approaches can be used to perform parabolic approximation in embodiments described herein.

Figure 4:
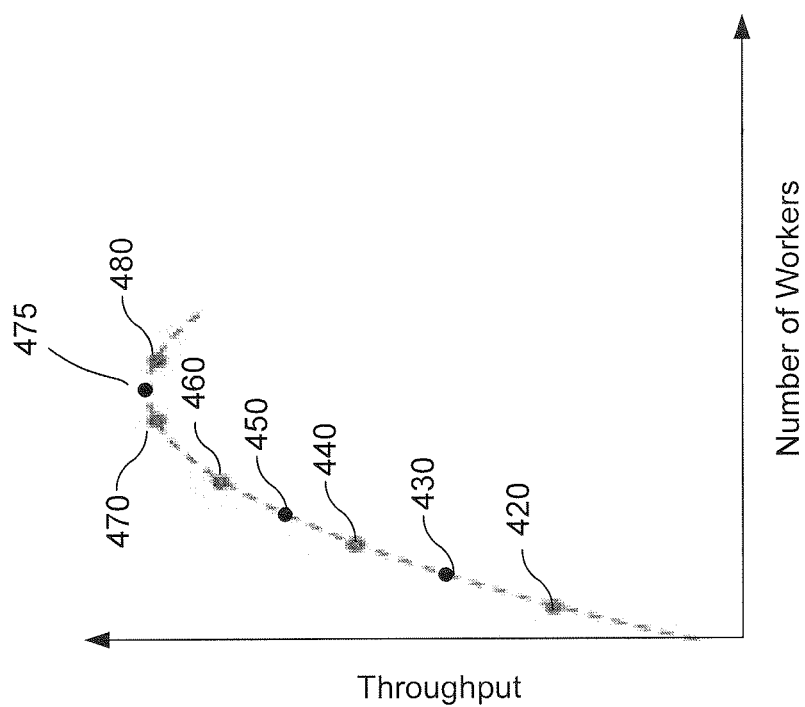

For example, referring to FIG. 4, point 420 represents a first data set, step 430 represents a second data set and step 440 represents a third data set, and point 470 represents a point selected from a parabolic approximation of the 420, 430, 440 throughput curve. In this embodiment, the collection and analysis of data points 450, 460 and 470 can be avoided by using the parabolic estimation to move to point 475. Different embodiments of parabolic estimation can select different points based on the example data samples, e.g., selecting point 470 instead of point 475. These different points in embodiments can be selected, for example, based on threshold limits applied to workers or throughput, e.g., limit the number of assigned workers to a specific amount.

As would be appreciated by one having skill in the relevant arts, in a traditional approach to using parabolic approximation to select workers, the collection of data for the stored data sets is not associated with productive steps to tune the number of workers. For example, if data sets 420, 430 and 440, as described above are collected using a traditional parabolic approximation approach, no advantageous changes in worker amounts are performed with the collection.

In contrast to the traditional approach, in an embodiment, as noted above, steps S1-S9 both collect data sets for the parabolic approximation of step S12 and change the number of assigned workers. Thus after each of the data sets 420, 430 and 440 are collected, in an embodiment, the number of workers can be advantageously changed.

An additional advantage in parabolic estimation is achieved by an embodiment because of the amount, and additional types of data stored in step S6 above. In contrast to the data sets collected with traditional parabolic approximation approaches, an embodiment has additional data points available for storage and analysis. As noted with step S6 above, for example, the amount of workers added or removed from system processing can be stored for analysis in the analysis of step S11. As would be appreciated by one having skill in the relevant art, given the teachings herein, more data points can allow an embodiment to perform more useful parabolic approximation in step S11.

V3) In an embodiment, each of the predetermined wait intervals (e.g., in steps S2, S4, S9, S13) can be different or the same value. Different considerations can affect these settings. Wait intervals may be varied during execution based on different collected factors.

V4) In an embodiment, in a variation of step S8A above, only if the second throughput value is greater than the first by at least a particular threshold amount, then increase the number of workers in the worker pool by a fixed amount.

V5) In an embodiment, in a variation of step S8B above, only if the second throughput value is less than the first by at least a particular threshold amount, then decrease the number of workers in the worker pool by a fixed amount.

Data Variation Embodiment

V6) The following section describes an embodiment having an additional variation. In an embodiment, steps S11 and S12 listed above are: analyze the stored data sets and select an amount of workers based on this analysis, respectively. In a variation embodiment, with respect to steps S11 and S12, first a determination is made as to whether the stored data sets to be analyzed in step S11 have useful data points, then, if the data points are not determined to be useful, returning to step S1 without performing step S12, e.g., modifying the number of assigned workers.

As noted above with step S10, in different embodiments, steps S1 through S9 are repeated for a number of times. In embodiments, the number of times to repeat steps S1 through S9 can be fixed or variable. Different considerations can, in embodiments, can affect the number. Considerations F1-F4 are meant to be illustrative, non-limiting examples of different factors that can, in embodiments, affect the number of repetitions of step S1-S9:

F1. The determined usefulness of the collected data points. For example, in an embodiment, the more useful data points collected, the less repetitions of steps S1-S9 need to be performed. Having useful data points allows steps S11-S12 to select new worker allocations with less data collection, and thus less repetitions of S1-S9 are required.

F2. A determined likelihood of collecting useful data points. In an embodiment, after a determination, over time, is made as to the usefulness of the data sets collected in steps S1-S9, a determination is made as to the likelihood that, for each collected data set, the set will be useful. If this likelihood is high, in an embodiment, then less repetitions of S1-S9 will need to be performed.

F3. The need for a "conservative" approach to worker allocation. For example, in some circumstances the approach detailed in steps S1-S9 results in conservative (smaller, incremental) changes in worker allocation. Increasing the number of repetitions of S1-S9 will act, in an embodiment, to prefer this conservative approach.

F4. The need for an "aggressive" approach. Conversely to F3, the approach detailed by steps S11-S12 can, in some embodiments, lead to more "aggressive" (larger) changes in worker allocation. In an embodiment, reducing the number of repetitions of steps S1-S9 can act to increase the performance of the steps S11-S12 aggressive approach.

As would be appreciated by one having skill in the relevant arts, given the teachings herein, different approaches can be used to determine an advantageous number of repetitions for steps S1-S9. Different approaches can use a single factor or a combination of multiple factors. In addition, different approaches used by embodiments can select a repetition value that remains fixed during system operation, or the value can dynamically change as the utilized factors change.

Figure 5:
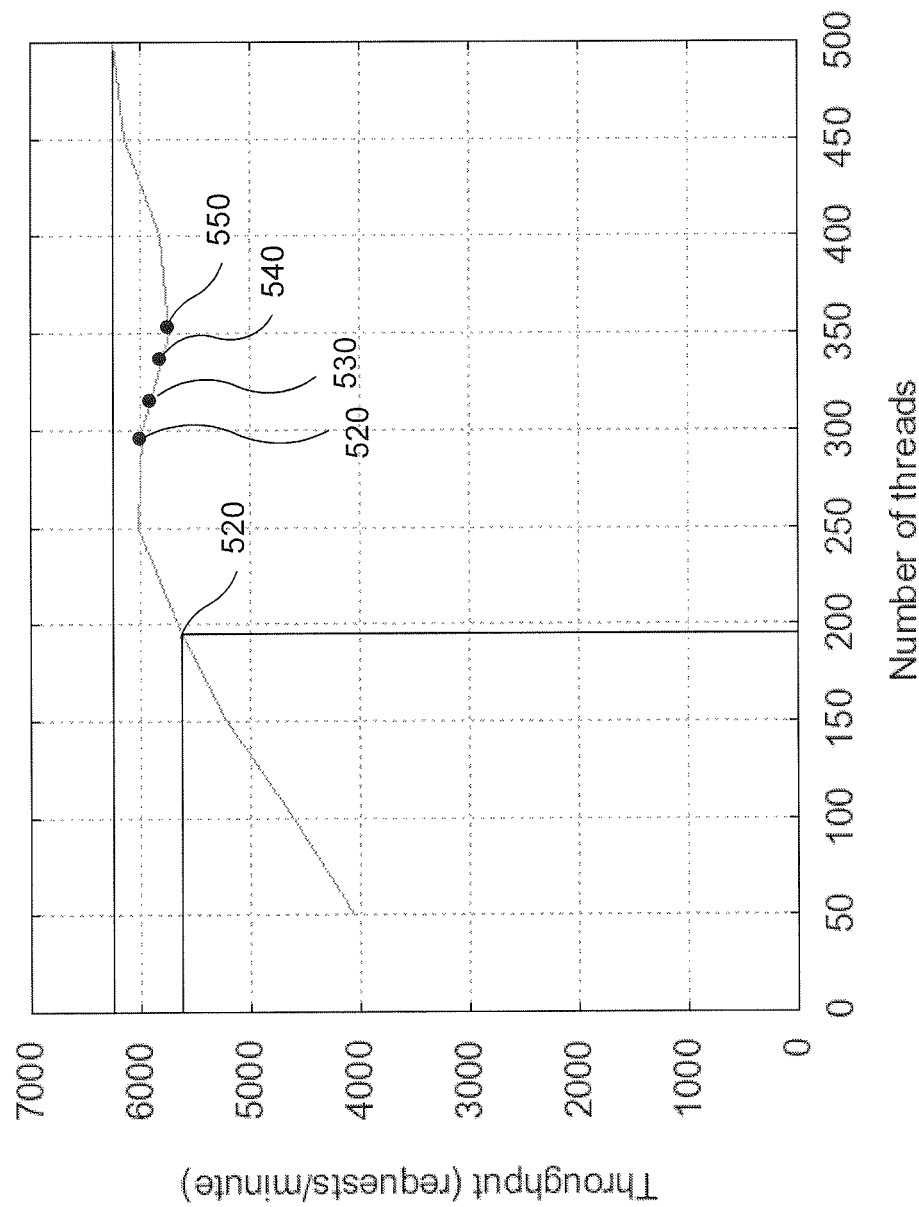

FIG. 5 depicts an example of an embodiment where non-useful data is analyzed with a parabolic estimation approach, e.g., the approach detailed in variation V2 above. In an embodiment, once collected data is determined to be non-useful, it is cleared from data set storage and additional data is collected.

In this example, step S11 uses parabolic estimation to analyze stored data sets from steps S4-S9. In the example depicted, points 520, 530 and 540 represent collected data sets stored as a result of steps S1-S9 above, and after three iterations step S11 uses parabolic estimation to select the next worker amount. In this example, the parabolic estimation method, instead of resulting in a concave down curve and selecting the topmost point as discussed with FIG. 4 and variation V2, instead results in a concave up curve with point 550 at the lowest point. In an embodiment, because of this concave up result, points 520, 530 and 540 are determined not to be useful data points by step S11 and the points are not used for analysis. In this example, instead of performing step S12, the operation returns to step S1 and the approach continues.

Figure 6:
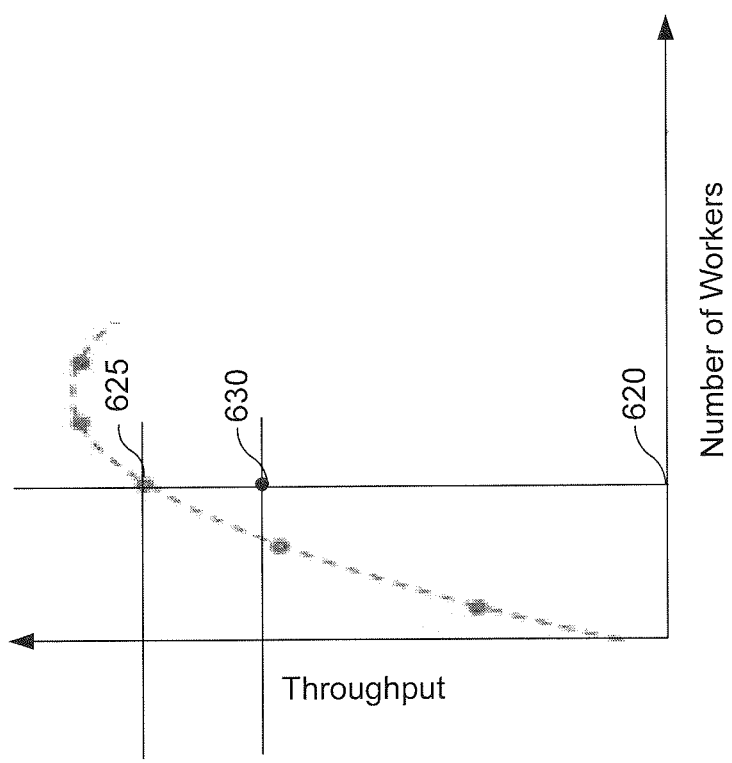

As depicted in FIG. 6, in another example of non-useful data points, a series of collected data points can result in more than one value (e.g., 625, 630) on the Y-Axis (throughput, as depicted on FIG. 6) for a single collected value on the X-Axis (Number of Workers). Having multiple Y-Axis values for the same X-Axis value can render different estimation approaches based on the points difficult or impossible, thus making the collected points non-useful. For example, as used in the previous example, the duplicate Y-Axis values described generally render parabolic estimation approach discussed above unusable.

As would be appreciated by one having skill in the art and with the knowledge of embodiments described herein, other approaches to determining useful data points for different types of analysis can be used to determine useful data points for the step S11 analysis.

Variable Step Size

V7) The following section describes an embodiment having an additional variation. In an embodiment with a variation to steps S1-S9, a variable increment/deincrement amount can be used in steps S8A,S8B respectively instead of the fixed amount described above. In an embodiment, the variable amount is determined by Formula 1 and Table 1 listed below:

$$n^{limit}(t_i) = \left( \frac{\left( \frac{P(t_i) - P(ti-1)}{P(t_{i-1})} \right)}{C} * n^*(t_{i-1}) \right) + n^*(ti-1) \quad \text{Formula 1}$$

TABLE 1

| Notation | Description |
| --- | --- |
| t | Time interval $t_{i-1}$ is the previous time interval and $t_i$ is the current time interval. |
| $n^*(t_i)$ | The number of workers the server has available during the control interval. |
| $P(t_i)$ | The actual measured throughput level of the server at time $t_i$. |
| $n^{limit}$ | A new selected worker level. |
| C | The percentage change in throughput over the percentage change in number of workers. A parameter to the formula from 0-1, that specifies how "aggressive" the change in workers should be based on the formula, e.g., an aggressiveness setting. The larger the value, the smaller the change will be. |

In an embodiment, the C value noted above is a parameter to the formula that specifies how "aggressive" the change in workers should be based on the formula, e.g., how large a change to make in the existing worker level.

The following example illustrates a variable increment for steps S1-S9 using an embodiment of Formula 1 shown above.

TABLE 2

| Variable | time $t_{i-1}$ | time $t_i$ | Delta Percentage |
| --- | --- | --- | --- |
| P | 100 | 130 | 0.3 |
| n | 10 | 15 | 0.5 |

In a non-limiting example shown in Table 2 above, the fixed step size for the number of workers n is 5. Using formula 1, and given the values in Table 2, and a C parameter value of 0.2, the determined new workers level ($n^{limit}$) is 25. Thus, for a subsequent period, e.g., $t_{i+1}$, for step S8A above, instead of incrementing at the fixed interval (n=5) and moving to 20 workers, Formula 1 determines that the number of workers should be set to 25. In an embodiment, this jump can increase performance by improving the speed with which improved worker levels are determined.

The above Formula 1 and Table 1 are intended to be non-limiting. A person having skill in the relevant arts will appreciate that aspects of the Formula 1 may be performed using different techniques and have different results without departing from the spirit of embodiments described herein.

Method 700

Figure 7A:
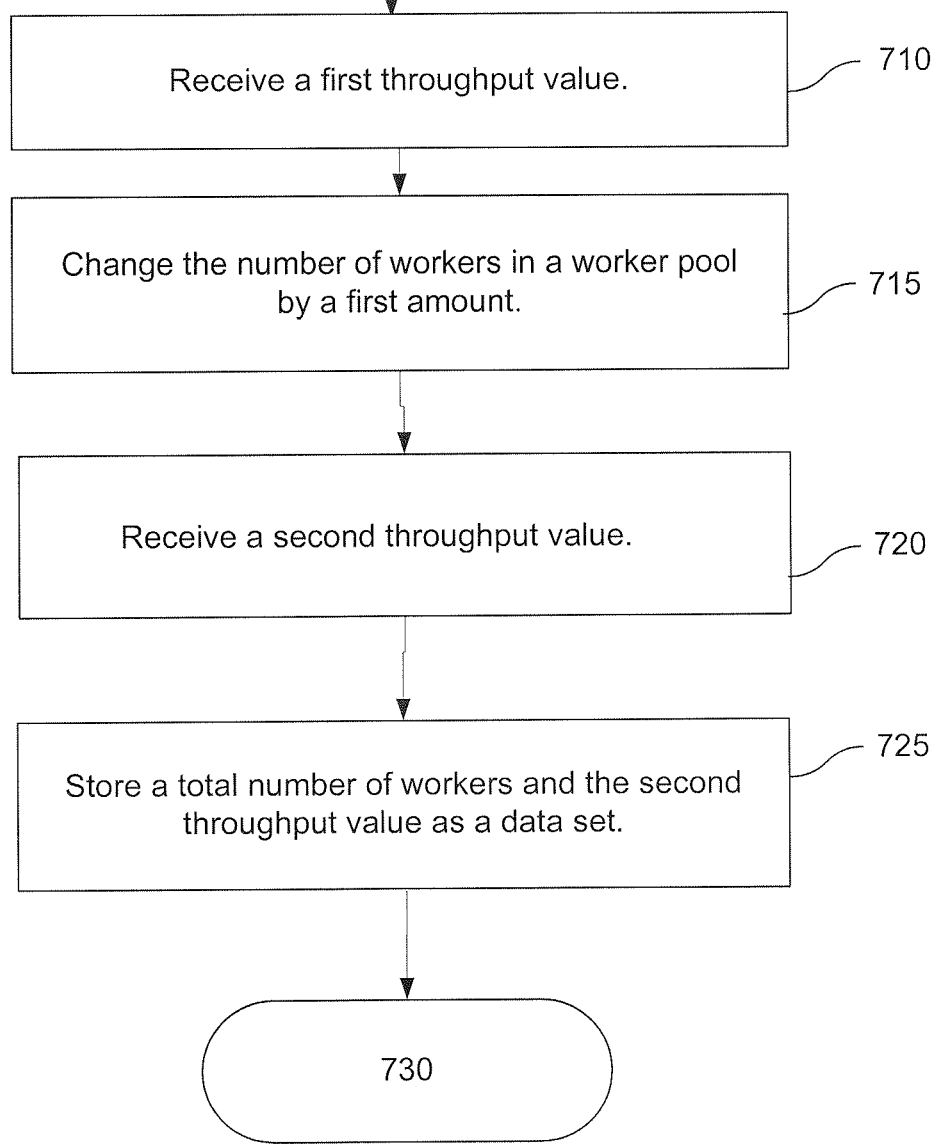
FIGS. 7A-C show a flowchart illustrating a method of providing inheritance to a programming language according to an embodiment of the present invention.
Figure 7B:
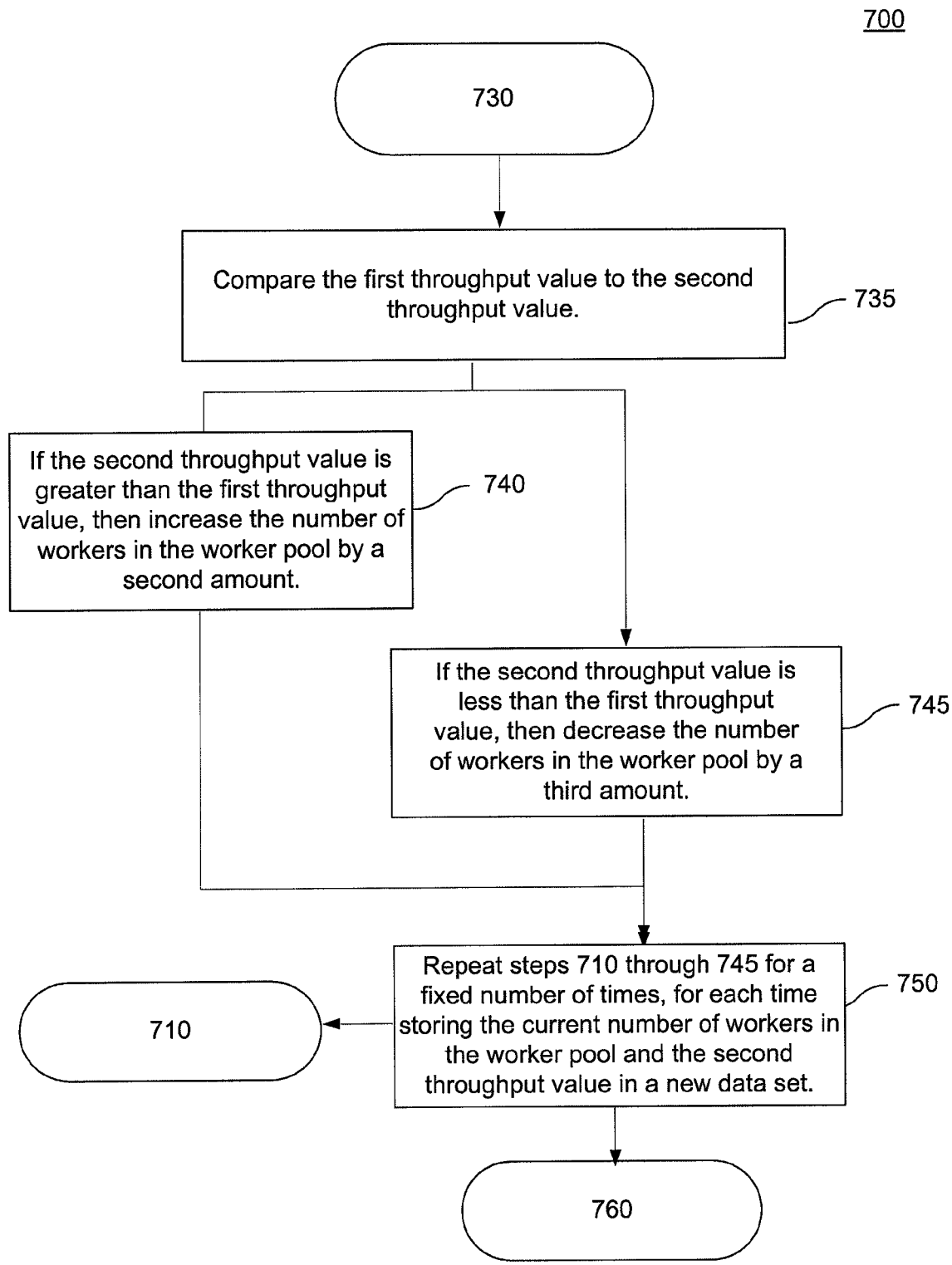
Figure 7C:
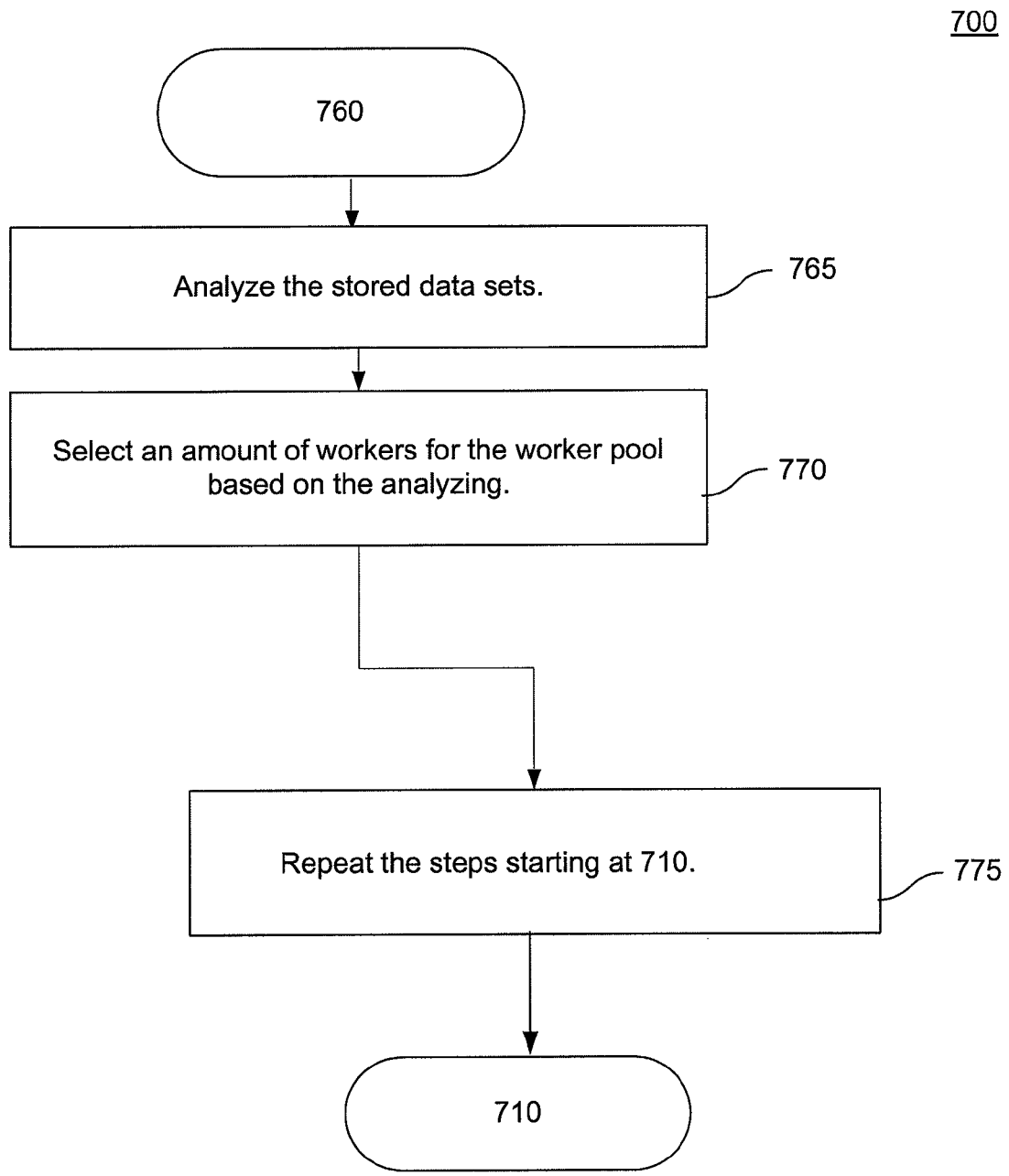
Figure 8:
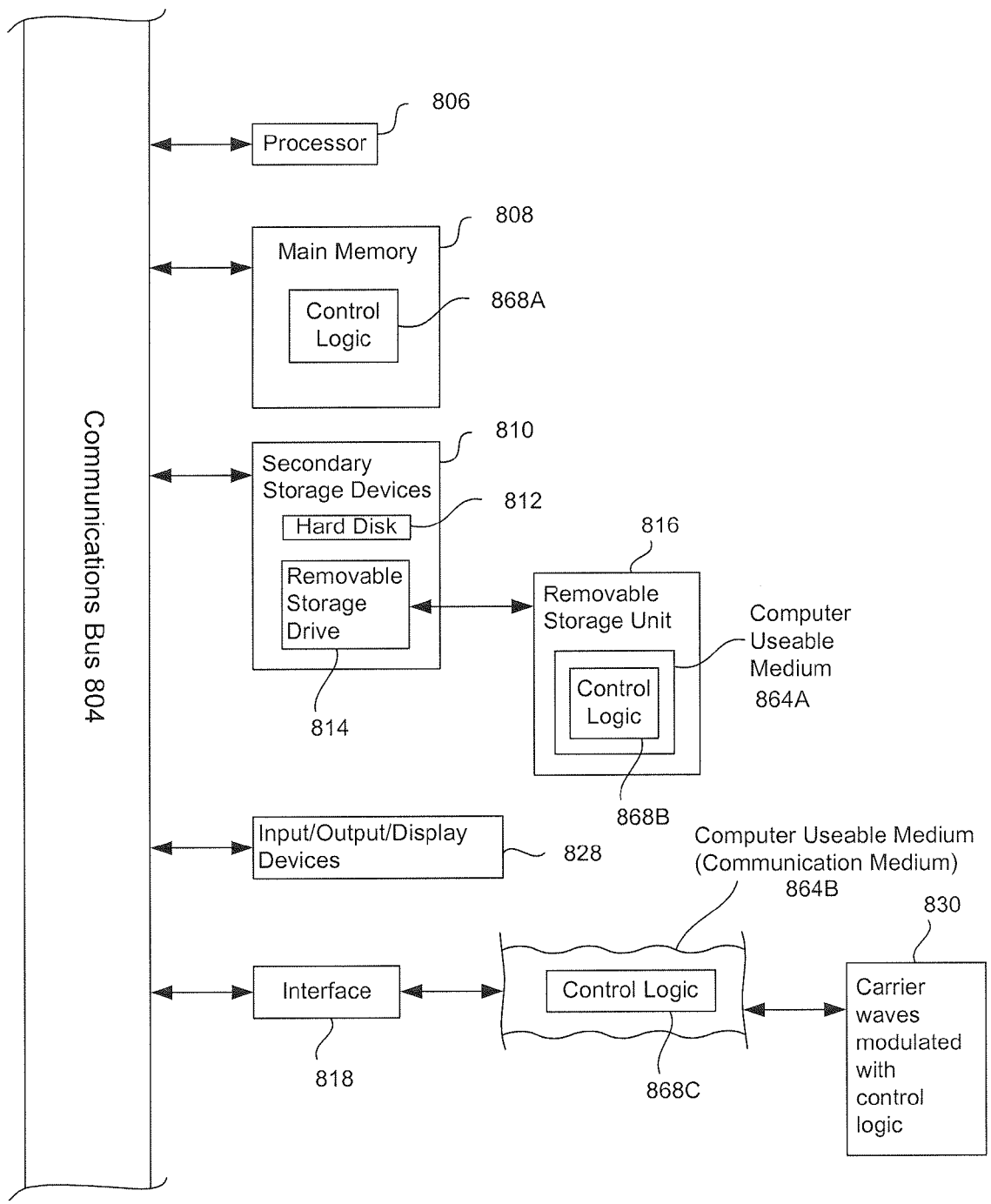
FIG. 8 illustrates an example computer system, useful for implementing components of embodiments described herein, according to an embodiment of the present invention.

This section and FIGS. 7A-C summarize the techniques described herein by presenting a flowchart of an exemplary method 700 of allocating a number of workers to a worker pool in a multiprogrammable computer. While method 700 is described with respect to an embodiment of the present invention, method 700 is not meant to be limiting and may be used in other applications.

As shown in FIG. 7A, an embodiment of method 700 begins at step 710 where a first throughput value is received. In an embodiment, as shown on FIG. 2, controller, such as controller 150 receives a first throughput value from connections 245, 235 or 255. Once step 710 is complete, method 700 proceeds to step 715.

At step 715, the number of workers in a worker pool is changed by a first amount. In an embodiment, the number of workers in a worker pool, e.g., worker pool 110 from FIG. 1, is changed by a first amount. Once step 715 is complete, method 700 proceeds to step 720.

At step 720, a second throughput value is received. In an embodiment, a second throughput value is received by controller 150 from FIG. 1. Once step 720 is complete, method 700 proceeds to step 725.

At step 725, a total number of workers and the second throughput value is stored as a data set. In an embodiment, a total number of workers and the second throughput value is stored by controller 150. Once step 725 is complete, method 700 proceeds to step 735 depicted on FIG. 7B.

At step 735, the first throughput value is compared to the second throughput value. In an embodiment, the first throughput value is compared to the second throughput value by controller 150. Once step 735 is complete, method 700 proceeds to step 740 or step 745.

If the second throughput value is greater than the first throughput value, then the number of workers in the worker pool is increased by a second amount at step 740. In an embodiment, if controller 150 determines that the second throughput value is greater than the first throughput value, then controller 150 increases the number of workers in the worker pool by a second amount.

If the second throughput value is less than the first throughput value, then the number of workers in the worker pool is decreased by a third amount at step 745. In an embodiment, if controller 150 determines that the second throughput value is less than the first throughput value, then controller 150 decreases the number of workers in the worker pool by a second amount. Once steps 740 or 745 are completed, method 700 proceeds to step 750.

At step 750, steps 710 through 745 are repeated for a fixed number of times, for each time storing the current number of workers in the worker pool and the second throughput value in a new data set. In an embodiment, controller 150 manages the repeating of steps 710 through 745 and stores the throughput values. Once step 750 is complete, method 700 proceeds to step 765.

At step 765, the stored data sets are analyzed. In an embodiment, controller 150 analyzes the stored data sets using, for example, the parabolic approximation technique described above. Once step 765 is complete, method 700 proceeds to step 770.

At step 770, an amount of workers is selected for the worker pool based on the analysis of step 765. In an embodiment, controller 150 selects an amount of workers for worker pool 110 based on the analyzing of step 765. When step 770 is completed, method 700 is repeated starting at step 710.

Example Computer Embodiment

In an embodiment of the present invention, the system and components of embodiments described herein are implemented using well known computers. For example, systems 101 and 201 shown in FIGS. 1 and 2 respectively and the operation of flowcharts in FIGS. 7A-B described above, can be implemented using computer(s) 802.

Computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. In an embodiment, this one or more processors completes tasks for worker pool 110, as depicted on FIGS. 1 and 2. The processor 806 is connected to a communication bus 804.

The computer 802 also includes a main or primary memory 808, such as random access memory (RAM). The primary memory 808 has stored therein control logic 868A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 868B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 828, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 864B (representing a form of a computer useable or readable medium), such as LANs, WANs, the Internet, etc. The network interface 818 may interface with remote sites or networks via wired or wireless connections.

Control logic 868C may be transmitted to and from the computer 802 via the communication medium 864B. More particularly, the computer 802 may receive and transmit carrier waves (electromagnetic signals) modulated with control logic 830 via the communication medium 864B.

Any apparatus or manufacture comprising a computer useable or readable medium 864 having control logic (software) 868B stored therein is referred to herein as a computer program product or program storage device (which are articles of manufacture). This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

Embodiments described herein provide methods and systems for allocating a number of workers to a worker pool in a multiprogrammable computer. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of tuning a multiprogramming level of a computer, comprising:
    monitoring throughput in relation to a workload concurrency level, resulting in a plurality of collected throughput values;
    during the monitoring, first adjusting the multiprogramming level based on the collected throughput values;
    modeling the plurality of collected throughput values as a first throughput curve using a parabolic estimation function;
    determining whether the modeled first throughput curve contains a concave up curve;
    if the modeled first throughput curve contains the concave up curve, repeating the monitoring, the first adjusting, the modeling, and the determining, wherein the repeated modeling results in a second throughput curve based on the throughput values collected in the repeated monitoring; and
    if the modeled first throughput curve does not contain the concave up curve, second adjusting the multiprogramming level based on a value derived from the first throughput curve modeled using the parabolic estimation function.

2. The method of claim 1, wherein the monitoring of throughput in relation to a workload concurrency level is based on data from a request queue or an output counter.

3. The method of claim 1, wherein the first adjusting of the multiprogramming level is based on a hill climbing approach.

4. The method of claim 1, wherein at least one of the adjustments comprises increasing or decreasing a number of workers allocated to the multiprogramming level if a second monitored throughput value is greater than or less than a first monitored throughput value by a threshold amount.

5. The method of claim 1, wherein adjusting the multiprogramming level based on the collected throughput values comprises:
    (a) receiving a first throughput value;
    (b) changing a number of workers in a worker pool by a first amount;
    (c) receiving a second throughput value;
    (d) storing a total number of workers and the second throughput value as a data set of collected throughput values;
    (e) comparing the first throughput value to the second throughput value;
    (f) if the second throughput value is greater than the first throughput value, increasing the number of workers in the worker pool by a second amount; and
    (g) if the second throughput value is less than the first throughput value, decreasing the number of workers in the worker pool by a third amount.

6. The method of claim 5, further comprising:
    (h) repeating steps (a) through (g) for a fixed number of times, each time storing a current number of workers in the worker pool and the second throughput value in a new data set of collected throughput values;
    (i) analyzing stored data sets;
    (j) selecting an amount of workers for the worker pool based on the analyzing; and
    (k) repeating steps (a)-(j).

7. The method of claim 1, wherein the second adjusting is performed unless the modeled first throughput curve renders the parabolic estimation function unusable.

8. The method of claim 1, wherein at least one of the adjustments is based on one of:
    a difference between a current collected throughput value and a previous collected throughput value;
    the current collected throughput value;
    a number of workers currently assigned to a worker pool; and
    a predetermined parameter value.

9. The method of claim 8, wherein at least one of the adjustments is determined using an aggressiveness setting according to an equation:

$$n^{limit}(t_i) = \left( \frac{\frac{P(t_i) - P(ti-1)}{P(t_{i-1})}}{C} * n * (t_{i-1}) \right) + n * (ti-1)$$

$t_i$ is a current time interval;
    $t_{i-1}$ is a previous time interval;
    $n^*(t_i)$ is a number of workers the server has available during the current time interval;
    $P(t_i)$ is a monitored throughput level at time $t_i$;
    $n^{limit}(t_i)$ is an adjusted worker level for the current time interval; and
    C is the aggressiveness setting.

10. A non-transitory computer-readable medium having computer-executable instructions stored thereon that, when executed by a computing device, cause the computing device to perform a method of tuning a multiprogramming level of a computer, the method comprising:
    monitoring throughput in relation to a workload concurrency level, resulting in a plurality of collected throughput values; and
    during the monitoring, first adjusting the multiprogramming level based on the collected throughput values;
    modeling the plurality of collected throughput values as a first throughput curve using a parabolic estimation function;
    determining whether the modeled first throughput curve contains a concave up curve;
    if the modeled first throughput curve contains the concave up curve, repeating the monitoring, the first adjusting, the modeling, and the determining, wherein the repeated modeling results in a second throughput curve based on the throughput values collected in the repeated monitoring; and
    if the modeled first throughput curve does not contain the concave up curve, second adjusting the multiprogramming level based on a value derived from the first throughput curve modeled using the parabolic estimation function.

11. The non-transitory computer-readable medium of claim 10, wherein the monitoring of throughput in relation to a workload concurrency level is based on data from a request queue or an output counter.

12. The non-transitory computer-readable medium of claim 10, wherein the first adjusting of the multiprogramming level is based on a hill climbing approach.

13. The non-transitory computer-readable medium of claim 10, wherein one of the adjustments comprises increasing or decreasing a number of workers allocated to the multiprogramming level if a second monitored throughput value is greater than or less than a first monitored throughput value by a threshold amount.

14. The non-transitory computer-readable medium of claim 10, wherein adjusting the multiprogramming level based on the collected throughput values comprises:
(a) receiving a first throughput value;
(b) changing a number of workers in a worker pool by a first amount;
(c) receiving a second throughput value;
(d) storing a total number of workers and the second throughput value as a data set;
(e) comparing the first throughput value to the second throughput value;
(f) if the second throughput value is greater than the first throughput value, then increasing the number of workers in the worker pool by a second amount; and
(g) if the second throughput value is less than the first throughput value, then decreasing the number of workers in the worker pool by a third amount;
(h) repeating steps (a) through (g) for a fixed number of times, each time storing a current number of workers in the worker pool and the second throughput value in a new data set;
(i) analyzing stored data sets;
(j) selecting an amount of workers for the worker pool based on the analyzing; and
(k) repeating steps (a)-(j).

15. A system for controlling tuning of a multiprogramming level of a computer, comprising:
a memory comprising a storage;
a controller implemented on a processor coupled to the memory, wherein the controller is configured to:
monitor throughput in relation to a workload concurrency level resulting in a plurality of collected throughput values stored in the storage,
during the monitoring, first adjust the multiprogramming level based on the collected throughput values,
model the plurality of collected throughput values as a first throughput curve using a parabolic estimation function;
determine whether the modeled first throughput curve contains a concave up curve;
if the modeled first throughput curve contains the concave up curve, repeat the monitoring, the first adjusting, the modeling, and the determining, wherein the repeated modeling results in a second throughput curve based on the throughput values collected in the repeated monitoring; and
if the modeled first throughput curve does not contain the concave up curve, second adjust the multiprogramming level based on a value derived from the first throughput curve modeled using the parabolic estimation function.

16. The system of claim 15 wherein the system further comprises a worker pool, and the controller is configured to adjust the multiprogramming level by allocating workers to the worker pool by:
(a) receiving a first throughput value;
(b) increasing a number of workers in the worker pool by a first amount;
(c) receiving a second throughput value;
(d) storing a total number of workers and the second throughput value as a data set of collected throughput values stored in the storage;
(e) comparing the first throughput value to the second throughput value;
(f) if the second throughput value is greater than the first throughput value, then increasing the number of workers in the worker pool by a second amount;
(g) if the second throughput value is less than the first throughput value, then decreasing the number of workers in the worker pool by a third amount;
(h) repeating steps (a) through (g) for a fixed number of times, for each time storing the current number of workers in the worker pool and the second throughput value in a new data set;
(i) analyzing stored data sets in the storage;
(j) selecting an amount of workers for the worker pool based on the analyzing; and
(k) repeating the steps starting at step (a).

17. The system of claim 16, further comprising:
a request queue;
an output counter, wherein at least one of the throughput values received in (a) and (c) are determined using data received from the request queue and the output counter.

18. The system of claim 16, further comprising prior to (i):
determining if the data sets in the storage can be used to perform an estimation analysis;
and wherein (j) further comprises:
selecting the amount of workers for the worker pool based on the analyzing if the data sets in the storage can be used to perform the estimation analysis.

19. The system of claim 15, wherein the controller is further configured to perform the second adjust of the multiprogramming unless the modeled first throughput curve renders the parabolic estimation function unusable.

20. The system of claim 15, wherein the controller is further configured to perform the second adjust of the multiprogramming level based on a maximum threshold for the multiprogramming level and the derived value, wherein the derived value is a topmost point of the first throughput curve modeled using the parabolic estimation function.

* * * * *